(12) United States Patent
Portner

(10) Patent No.: US 7,276,174 B2
(45) Date of Patent: Oct. 2, 2007

(54) PRE-TREATMENT OF PLASTIC MATERIALS

(75) Inventor: Jean-claude Portner, Juvisy sur Orge (FR)

(73) Assignee: Coventya, Clichy (FR)

( * ) Notice: Subject to any disclaimer, the term of this patent is extended or adjusted under 35 U.S.C. 154(b) by 439 days.

(21) Appl. No.: 10/473,053

(22) PCT Filed: Apr. 9, 2002

(86) PCT No.: PCT/FR02/01226

§ 371 (c)(1),
(2), (4) Date: Sep. 29, 2003

(87) PCT Pub. No.: WO02/081554

PCT Pub. Date: Oct. 17, 2002

(65) Prior Publication Data

US 2004/0089633 A1    May 13, 2004

(30) Foreign Application Priority Data

Apr. 9, 2001  (FR) .................................. 01 04781

(51) Int. Cl.
B44C 1/22 (2006.01)
C03C 25/68 (2006.01)
C03C 15/00 (2006.01)
C23F 1/00 (2006.01)

(52) U.S. Cl. ...................................... 216/83
(58) Field of Classification Search .................. 216/96, 216/34, 35, 28, 83; 264/341; 252/79.1
See application file for complete search history.

(56) References Cited

U.S. PATENT DOCUMENTS 3,672,940 A    6/1972    Funada et al.
4,448,811 A  *  5/1984    Doty et al. .................. 427/304
4,940,608 A  *  7/1990    Kawagishi et al. .......... 427/259

FOREIGN PATENT DOCUMENTS

| JP | 55080438 | | 6/1980 |
| JP | 358005335 A | * | 1/1983 |
| JP | 59043036 | | 3/1984 |
| JP | 02232237 | | 9/1990 |
| JP | 06279609 | | 10/1994 |

OTHER PUBLICATIONS

Abstract, Database WPI, Section Ch, Week 198651, Derwent Publications Ltd., London, GB, AN 1986-336169, XP-002207726 & JP 61 252236 A (Nippon Sensor KK), Nov. 10, 1986.
Abstract, Database WPI, Section Ch, Week 197601, Derwent Publications Ltd., London, GB, AN 1976-00890X, XP-002207727 & JP 50 075269 A (Tohei Mekki KK), Jun. 20, 1975.
Abstract, Database WPI, Section Ch, Week 198630, Derwent Publications Ltd., London, GB, AN 1986-192233, XP-002207725 & JP 61 123536 A (Toray Ind Inc), Jun. 11, 1986.
Abstract, Database WPI, Section Ch, Week 198341, Derwent Publications Ltd., London, GB, AN 1983-786728, XP-002207728 & JP 58 149924 A (Canon KK), Sep. 6, 1983.

* cited by examiner

*Primary Examiner*—Parviz Hassanzadeh
*Assistant Examiner*—Roberts Culbert
(74) *Attorney, Agent, or Firm*—Knobbe, Martens, Olson & Bear, LLP

(57) ABSTRACT

The invention concerns a method for chemical attack of the surface of a plastic material with a solution based on sulphuric acid and chromic anhydride, characterised in that (i) the sulphuric acid concentration ranges between 500 and 760 g/l and (ii) the chromic anhydride concentration ranges between 30 and 200 g/l and (iii) the resulting acidity is at least equal to 13 and at most equal to 16.

9 Claims, No Drawings

PRE-TREATMENT OF PLASTIC MATERIALS

This application is the U.S. National Phase under 35 U.S.C. § 371 of International Application PCT/FR02/01226, filed Apr. 9, 2002, which was published in a language other than English which claims priority of French application No. 01/04781, filed Apr. 9, 2001 Each of the above applications are incorporated herein by reference in their entirety.

The subject of the present invention is a method of chemically etching plastic surfaces intended or not to be coated with a metal deposit.

The present invention relates to the field of coating parts generally made of plastic, in particular metal coatings used by way of technical or decorative coatings.

This type of metallized part is most particularly sought in the automotive industry, the bathroom accessory and sanitary equipment industry and in the cosmetics and perfumery industries. Moreover, these types of coating are most particularly useful for applications aiming to take advantage of the conductivity of metals and the insulation of plastics, especially in the fields of telecommunications and electronics. Continuous metallization of plastics is generally carried out by electrolysis in an aqueous medium after chemical conditioning of the surface as a whole by oxidation or chemical dissolution, which makes it possible to create a microporous hydrophilic surface. The chemical conditioning of the surface is generally carried out by satining formulations containing at least chromic anhydride and sulphuric acid, possibly combined with phosphoric acid and fluorinated surfactants.

These formulations, which are very widely used today, have major drawbacks from the point of view of ecology, safety and waste disposal.

This is because they contain concentrations of chromic acid of between 380 g/l and 450 g/l, which has to be removed in the various industrial processes, since this product is particularly dangerous for the environment and human health.

However, to date, this compound has been considered indispensable to etching plastic since it makes it possible to create the microroughnesses needed to anchor the catalysis and the successive metal deposits.

Several attempts have been made to reduce the concentration of chromic anhydride in these satining formulations, but none of these formulations have been able to give satisfactory results, especially since they create defects on the surface of the treated plastic. Other substitution formulations which have been proposed have the major drawback of metallizing the plastisol-based supports which bear the parts to be treated. The possible replacement of these plastisols with fluorinated coatings would require very high investment by the manufacturers as well as the development of a new method of treating plastic.

Thus, the development of a method of chemical etching making it possible to avoid these drawbacks would be very beneficial.

Now, the inventor has found, very surprisingly, that it is possible to carry out this chemical treatment of surfaces by decreasing the chromic acid concentration while at the same time obtaining defect-free surfaces allowing good adhesion of the coatings which are applied thereon.

Consequently, the subject of the present invention is a method of chemically etching the surface of a plastic using a sulphuric acid and chromic anhydride solution, characterized in that:

(i) the sulphuric acid concentration is between 500 and 760 g/l,
(ii) the chromic anhydride concentration is between 30 and 200 g/l, advantageously between 30 and 150 g/l, and
(iii) the resulting acidity is at least 13 and at most 16.

In the context of the present invention, the term "resultant acidity" means the acidity calculated for 1 ml of solution titrated with 1N NaOH; that is:

(A) the determined chromic acid ($CrO_3$) concentration expressed in g/l,
(B) the determined sulphuric acid ($H_2SO_4$) concentration expressed in g/l, and the total calculated acidity is equal to $(x+y)$ where $x = A \times 0.02$ and $y = B/49$. The calculated acidity is substantially equal to the measured acidity±0.5, the measured acidity varying according to the pH chosen at the point of colour change.

In one particular embodiment of the invention, the sulphuric acid concentration is between 500 and 600 g/l and the chromic anhydride concentration is between 60 and 150 g/l.

From among the plastics which may undergo the method of treatment according to the invention mention may be made especially of plastics converted by injection moulding, such as ABS (acrylonitrile butadiene styrene), ABS/PC (acrylonitrile butadiene styrene/polycarbonate) alloys, PPE (polyphenylene ether), PPO (polyphenylene oxide), polypropylenes and polyamides, as well as all plastics that can usually be metallized.

Within the scope of the method of the invention, the treatment is carried out at temperatures which are conventionally used, especially at temperatures from 65 to 70° C. for ABS and from 69 to 72° C. for polypropylenes and ABS/PC. Treatment times, also conventional, are preferably between 8 and 12 minutes for ABS and between 9 to 15 minutes for polypropylenes and ABS/PC.

In a preferred embodiment of the present invention, the solution used comprises, in addition, an oxidizing catalyst, present in a concentration of between 0.1 and 100 g/l, advantageously between 0.1 and 1 g/l.

According to a particularly advantageous embodiment of the invention, vanadium pentoxide or molybdic anhydride can be used as oxidizing catalyst.

In an even more advantageous way, the oxidizing catalyst is added in the form of a solution into a strong mineral acid. Where the oxidizing catalyst is vanadium pentoxide or molybdic anhydride, sulphuric acid can be used, especially 0.1 g/l to 200 g/l solutions of vanadium pentoxide in sulphuric acid.

Within the range of chromic anhydride and sulphuric acid concentrations used in the method according to the invention, the total titre of acidity expressed in ml of sodium hydroxide, must be between 13 and 16. The acidity limit is determined by the sulphuric acid concentration limit.

For conventional baths, beyond a sulphuric acid concentration of 450 g/l, chromic acid precipitation phenomena appear in the satining bath, which makes such formulas of little use in production. At a lower value, the satining of plastics, especially that of ABS, is inadequate such that quality production cannot be envisaged; this is because the oxidation-reduction reactions within these satining formulations in contact with the plastics reduce the efficiency and the stability of the baths, making all production unpredictable, if not impossible.

According to the method of the invention, chromic anhydride concentrations are less than 15 to 3 times the values conventionally used while the sulphuric acid concentrations are only from 1.1 to 2 times greater than the values commonly used in the prior art methods.

According to the invention, the baths do not have the drawbacks listed above for the conventional baths.

Another subject of the present invention is a method of metallizing plastics, especially ABS plastics, comprising the following steps:
1) cleaning of the surfaces,
2) satining or sulphuric-chromic pretreatment using a method of chemically etching the surface of a plastic using a solution based on sulphuric acid and chromic anhydride, the said method being characterized in that:
   i) the concentration of sulphuric acid is between 500 and 760 g/l,
   ii) the concentration of chromic anhydride is between 30 and 200 g/l, advantageously between 30 and 150 g/l, and
   iii) the resulting acidity is at least 13, and at most 16
3) neutralization of the oxidation residues,
4) precatalysis
5) catalysis,
6) acceleration,
7) deposition of chemical nickel or of chemical copper, and possibly comprising rinsing steps between each step 1 to 7.

The subject of the invention is also a formulation which can be used to etch the surface of a plastic, the said formulation comprising
(i) sulphuric acid at a concentration of between 500 and 760 g/l,
(ii) chromic anhydride at a concentration of between 30 and 200 g/l, advantageously between 30 and 150 g/l, and
(iii) the resultant acidity of which is at least 13 and at most 16, and possibly comprising an oxidizing catalyst, preferably vanadium pentoxide or molybdic anhydride, and/or a fluorinated surfactant of the lithium or potassium or amine perfluoroalkyl sulphonate type. However, the viscosity of the satining formulations obtained by this method may make the use of such fluorinated surfactants unnecessary.

The subject of the invention is also a part made of ABS treated by the method according to the invention, which has a characteristic surface distinctive from that obtained by conventional pretreatment and which has two etching modes, that is oxidation/etching of the butadiene part with creation of micropores caused by the chromic acid and etching in the form of a radicular network connecting the micropores due to the oxidation caused by the corrosive action of the sulphuric acid.

The following examples illustrate the invention without in any way limiting it:

EXAMPLE NO. 1

Formulation for Treating ABS, ABS/PC Alloys, PPE and Polyamides
Chromic anhydride 60±20 g/l
Sulphuric acid 650±30 g/l
Catalyst ($V_2O_5$) 0.5 to 1 g/l
Fluorinated surfactant 2 to 5 ml/l, that is 0.1 to 0.5 g/l The calculated acidity is as follows:
Calculated mean acidity=14.465
Calculated minimum acidity=13.45
Calculated maximum acidity=15.48

EXAMPLE NO. 2

Formulation for Treating ABS, ABS/PC Alloys, PPE and Polyamides
Chromic anhydride 100±20 g/l
Sulphuric acid 650±30 g/l
Catalyst ($V_2O_5$) 0.5 to 1 g/l
Fluorinated surfactant 2 to 5 ml/l, that is 0.1 to 0.5 g/l The calculated acidity is as follows:
Calculated mean acidity=15.265
Calculated minimum acidity=14.25
Calculated maximum acidity=16.28

EXAMPLE NO. 3

Formulation for Treating Polypropylenes Intended to be Chromed
Chromic anhydride 150±20 g/l
Sulphuric acid 625±30 g/l
Catalyst ($V_2O_5$) 0.5 to 1 g/l
Fluorinated surfactant 2 to 5 ml/l, that is 0.1 to 0.5 g/l The calculated acidity is as follows:
Calculated mean acidity=15.75
Calculated minimum acidity=14.74
Calculated maximum acidity=16.77

EXAMPLE NO. 4

Formulation for Treating ABS, ABS/PC Alloys, PPE and Polyamides
Chromic anhydride 40±10 g/l
Sulphuric acid 730±30 g/l
Catalyst ($V_2O_5$) 0.5 to 10 g/l
or
Catalyst ($M_oO_3$) 0.5 to 10 g/l
Fluorinated surfactant 2 to 5 ml/l, that is 0.1 to 5.0 g/l The calculated acidity is as follows:
Calculated mean acidity=15.70
Calculated minimum acidity=14.70
Calculated maximum acidity=16.70

The method according to the invention makes it possible to obtain, after metallization, a good surface appearance, adherence of the metal deposits and resistance to thermal shock, to ageing and to corrosion of the products.

What is claimed is:
1. A method of chemically etching the surface of a plastic comprising: contacting the plastic with a solution based on sulfuric acid and chromic anhydride, wherein:
   (i) the sulfuric acid concentration is between 500 and 760 g/l;
   (ii) the chromic anhydride concentration is between 30 and 200 g/l,; and
   (iii) the resulting acidity is at least 13 and at most 16 and in that
   (iv) the solution comprises, in addition, an oxidizing catalyst at a concentration of between 0.1 and 100 g/l, wherein the oxidizing catalyst is vanadium pentoxide or molybdic anhydride.

2. The method according to claim 1, wherein the oxidizing catalyst is added as a solution into a strong mineral acid solution.

3. The method according to claim 1, wherein the vanadium pentoxide or the molybdic anhydride are in solution in the sulfuric acid.

4. The method of chemically etching the surface of a plastic according to claim 1, wherein the plastic is chosen from the group consisting of ABS, polypropylenes, polyamides, PPO, ABS/PC and PPE.

5. The method of claim 1, wherein the chromic anhydride concentration is between 30 and 150 g/l.

6. The method of claim 1, wherein the oxidizing catalyst is present at a concentration of between 0.1 and 1 g/l.

7. A solution based on sulfuric acid and chromic anhydride, wherein:
   (i) the concentration of sulfuric acid is between 500 and 760 g/l;
   (ii) the concentration of chromic anhydride is between 30 and 200 g/l; and
   (iii) the resulting acidity is at least 13 and at most 16 and in that
   (iv) the solution comprises, in addition an oxidizing catalyst at a concentration of between 0.1 and 100 g/l, further comprising a fluorinated surfactant of the lithium or potassium or amine perfluoroalkyl sulphonate type.

8. The solution of claim 7, wherein the chromic anhydride concentration is between 30 and 150 g/l.

9. The solution of claim 7, wherein the oxidizing catalyst is present at a concentration between 0.1 and 1 g/l.

* * * * *